United States Patent [19]
Ichikawa et al.

[11] Patent Number: 5,787,031
[45] Date of Patent: Jul. 28, 1998

[54] DIVIDER AND MULTIPLIER/DIVIDER USING SAID DIVIDER

[75] Inventors: Kohji Ichikawa, Obu; Hiroaki Tanaka, Okazaki, both of Japan

[73] Assignee: Nippondenso Co., Ltd., Kariya, Japan

[21] Appl. No.: 749,210

[22] Filed: Nov. 14, 1996

Related U.S. Application Data

[63] Continuation of Ser. No. 629,905, Apr. 9, 1996, abandoned, which is a continuation of Ser. No. 208,748, Mar. 11, 1994, abandoned.

[30] Foreign Application Priority Data

Mar. 12, 1993 [JP] Japan .................................... 5-051770

[51] Int. Cl.$^6$ .................................................. G06F 7/52
[52] U.S. Cl. ........................................ 364/764; 364/757
[58] Field of Search ................................ 364/757, 758, 364/761, 764, 784, 786

[56] References Cited

U.S. PATENT DOCUMENTS

| | | | |
|---|---|---|---|
| 4,441,158 | 4/1984 | Kanuma | 364/758 |
| 5,007,009 | 4/1991 | Azetsu | 364/764 |
| 5,365,471 | 11/1994 | Sato | 364/764 |

FOREIGN PATENT DOCUMENTS

| | | |
|---|---|---|
| 5-731042 | 2/1982 | Japan . |
| 6-126137 | 2/1986 | Japan . |
| 4-205139 | 7/1992 | Japan . |

*Primary Examiner*—Reba I. Elmore
*Assistant Examiner*—Emmanuel L. Moise
*Attorney, Agent, or Firm*—Cushman Darby & Cushman, IP Group of Pillsbury Madison & Sutro LLP

[57] ABSTRACT

A divider constituted by connecting in series a plurality of arithmetic units in such a manner as to correspond to the number of bits of first data, said divider comprising: a divisor data input unit for inputting a complement of 2 of divisor data in division as said first data signal lines for sending dividend data and said addition result data calculated by said arithmetic unit on the basis of said dividend data and selected by said selector of said arithmetic unit or said carry output data from said arithmetic unit of the most significant bit among said arithmetic units for effecting the arithmetic operation using said second data, as said second data; and an AND circuit for calculating a logical product between a logical product for each bit of said divisor data and said carry output data sent from said signal line, and supplying said logical product as said select signal to said selector.

10 Claims, 10 Drawing Sheets

DIVIDER AND MULTIPLIER/DIVIDER USING SAID DIVIDER

This is a continuation of application Ser. No. 08/629,905, filed on Apr. 9, 1996, which was abandoned upon the filing hereof which was a continuation of application Ser. No. 08/208,748, filed Mar. 11, 1994, now abandoned.

BACKGROUND OF THE INVENTION

1. Field of the Invention

The present invention relates to a divider and a multiplier/divider capable of improving an operational speed.

2. Description of the Related Art

Figure 12A:
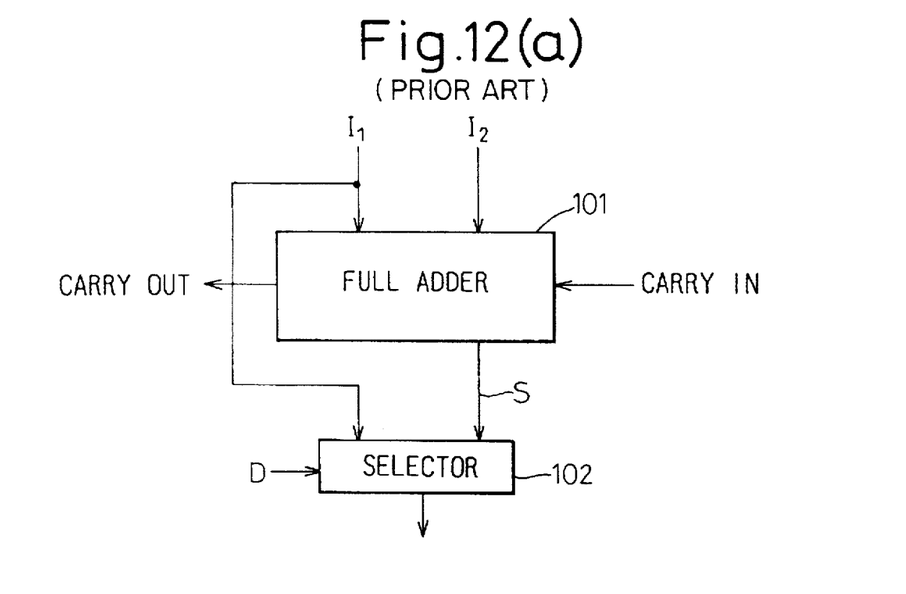
FIG. 12(a) is a block diagram showing a division cell of a divider according to the prior art.

Japanese Unexamined Patent Publication (Kokai) No. 4-205139 can be cited as a prior art reference relating to a divider. As shown in FIG. 12(a) of the accompanying drawings, this division cell comprises a full adder 101 and a selector 102.

The full adder 101 adds a carry input data (Carry in), a dividend data I1 and a divisor data I2, and outputs an addition result S and a carry output data (Carry out).

The selector 102 selects either the dividend data I1 or the addition result S on the basis of a select signal D, and outputs either of them as selected.

Figure 12B:
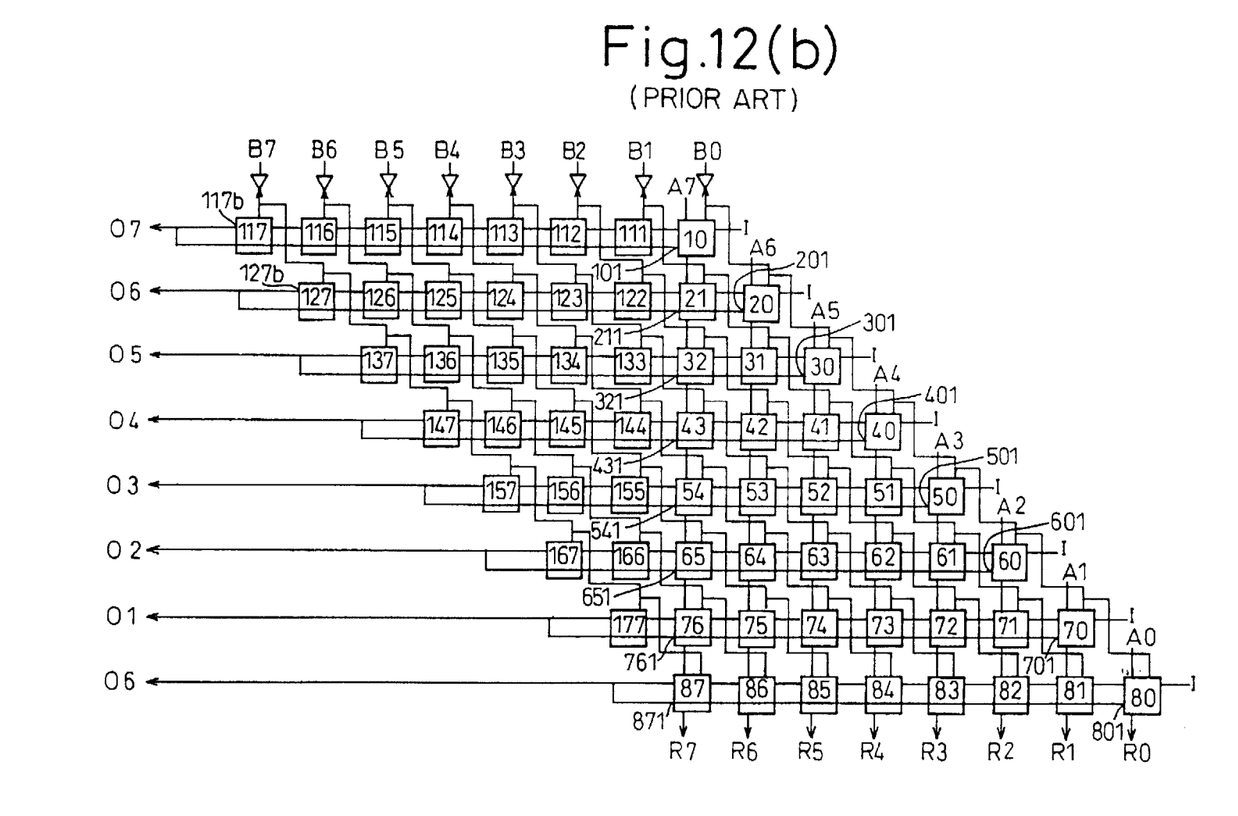
FIG. 12(b) is an overall structural view showing the divider according to the prior art.

A divider is constituted by arranging the division cells in a plurality of rows and columns in such a manner as to correspond to the number of constituent bits of data as shown in FIG. 12(b), and the carry output data (Carry out) of the most significant bit in each row becomes a quotient. This carry output data (Carry out) is the select signal D.

In the divider having the construction described above, whenever one division cell executes an operation, it outputs and delivers (shifts) the carry output data (Carry out) to the next higher order cell, and the next higher order cell uses this carry output data (Carry out) as a carry input data (Carry in) and executes its operation on the basis of this carry input data (Carry in). When this arithmetic operation is executed until the most significant bit is in a given row, the result is output as the quotient and the select signal, as described above. When this arithmetic operation is executed for a plurality of rows, division of a plurality of rows and columns is executed.

However, the divider described in the prior art reference, i.e. Japanese Unexamined Patent Publication (Kokai) No. 4-205139, involves the problem that the operational speed is low because the divider involves the shift operation to deliver the carry output data (Carry out) to the next higher order cell when the arithmetic operation is executed by one division cell.

SUMMARY OF THE INVENTION

It is therefore an object of the present invention to provide a divider and a multiplier/divider capable of improving the arithmetic operation speed by omitting an unnecessary shift.

To accomplish the object described above, the present invention provides a divider constituted by connecting in series a plurality of arithmetic units (FIG. 7, 1) in such a manner as to correspond to the number of bits of first data (FIG. 2, a0), whereby each of the arithmetic units includes an adder (4) for inputting the first data (FIG. 2, a0), second data (b0) and carry input data (Carry in), executing an addition operation on the data, and outputting addition result data (E) and carry output data (Carry out) to a next stage, and a selector (5-2) for selecting either the addition result data (E) from the adder (4) or the second data (b0) in accordance with a select signal (f2), wherein the divider comprises a divisor data input unit (FIG. 7, 3-0) for inputting a 2's complement of divisor data (FIG. 7, a[3]-a[0]) as the first data the carry output data (Carry out) from the arithmetic unit (1) of the most significant bit among the arithmetic unit (1) for executing the arithmetic operation using (FIG. 2, a0); signal lines (FIG. 7, 21) for sending dividend data (FIG. 7, c[3]-c[0]) as the second data (FIG. 2, b0) and the addition result data (E) calculated by the arithmetic unit (1) on the basis of the dividend data (FIG. 7, c[3]-c[0]) and selected by the selector (5-2) of the arithmetic unit (1) or the second data (b0) and an AND circuit (FIG. 7, 9) for calculating a logical product (FIG. 8, a1a2) for each bit of the divisor data (FIG. 7, a[3]-a[0]) and the carry output data (Carry out) sent from the signal line (21), and supplying the logical product (a1a212) as the select signal (f2) to the selector (5-2).

The present invention also provides a multiplier/divider created by connecting a plurality of arithmetic units (1) in a plurality of rows and columns to correspond to the number of constituent bits of input data, whereby each of the arithmetic units (1) includes control signal generation means (20) for generating a control signal (FIG. 7, CNTL) in accordance with multiplication or division, a logic circuit (6) for executing a logical product operation between first data (FIG. 2, a0) and second data (a1), a first selector (5-0) for selecting either an output of the logical circuit (6) or the first data (a0) using the control signal (CNTL), a second selector (5-1) for selecting third data (b1) or fourth data (b0) using the control signal, an adder (4) for receiving data sent by the first selector (5-0), data sent by the second selector (5-1) and carry input data (c1), executing an addition operation of these data and sending an addition result data and a carry output data (c0) to a next arithmetic unit, and a third selector (5-2) for selecting either the addition result data or the fourth data (b0) by the select signal (f2), wherein the multiplier/divider comprises a divisor data input unit (3-0) for inputting a 2's complement of divisor data (FIG. 7, a[3]-a[0]) at the time of division as the first data (a0); signal lines (FIG. 7, 21) for sending the carry output data (Carry out) from the arithmetic unit (1) of the most significant bit among the arithmetic unit (1) for executing the arithmetic operation using dividend data (FIG. 7, c[3]-c[0]), as the fourth data (FIG. 2, b0) the addition result data (E) calculated by the arithmetic unit (1) on the basis of the dividend data (c[3]-c[0]) and selected by the selector (5-2) of the arithmetic unit of fourth data (FIG. 2, b0); and a logical product circuit (FIG. 7, 9) for calculating a logical product (FIG. 8, a1a2) for each bit of the divisor data (FIG. 7, a[3]-a[0]) and the carry output data (Carry out) sent from the signal line (21), and supplying the logical product (a1a212) as the select signal (f2) to the selector (5-2).

The present invention provides a multiplier/divider with one-bit multiplier/divider units (1) in a plurality of rows and columns to correspond to the number of constituent bits of data input, whereby each of the one-bit multiplier/divider units (1) includes control signal generation means (20) for generating control signals (FIG. 1, CNTL) in accordance with multiplication and division; a logic circuit (6) for executing a logical product operation between first data (FIG. 2, a0) and second data (a1); a first selector (5-0) for selecting either an output of the logic circuit (6) or the first data (a0) in accordance with the control signal (CNTL); a second selector (5-1) for selecting third data (b1) or fourth data (b0) in accordance with the control signal; an adder (4) for receiving data delivered by the first selector (5-0), data delivered by the second selector (5-1) and carry input data (c1), executing an addition operation of these data, and sending addition result data and a carry output data (c0) for a next stage; and a third selector (5-2) for selecting addition result data from the adder (4) or the fourth data (b0); wherein the multiplier/divider further includes logical sum circuits (2, 9) for supplying a logical sum of the carry output data of the one-bit multiplier/divider (1) of each of the rows and the control signal as a select signal to the third selector (5-2) of each of the rows.

In the multiplier/divider described above, the present invention also provides a multiplier/divider which further includes a complement calculator at each of the input and output portions of the one-bit multiplier/divider for displaying the input and output data of the one-bit multiplier/divider as the 2's complement, and which executes both positive and negative multiplication and division.

In the present invention described above, the dividend data, the addition result data which is calculated by the arithmetic unit on the basis of this dividend data and is selected by the selector of this arithmetic unit, or the carry output data from the arithmetic unit having the most significant bit among the arithmetic units which execute the arithmetic operation by the use of the second data, are input to the logical product circuit through the signal lines. The logical product circuit calculates the logical product for each bit of the dividend data, and then calculates the logical product between this logical product of each bit and the carry output data. This resulting logical product becomes the quotient, and is also the select signal for the selector.

The logical product for each bit of the dividend data is calculated by the logical product circuit in the present invention. Therefore, the quotient can be calculated by calculating the logical product between the carry output data at the arithmetic unit to which the dividend data is inputted and the logical product for each bit of the dividend data. In other words, the dividend data can be obtained by effecting carry-down one bit by one from the higher order bits, and the quotient in a given row can be determined by calculating the logical product with the signal from the arithmetic unit which is affected by the dividend data of the most significant bit at the time of calculation. Accordingly, the present invention provides the effect that the operational speed becomes faster than when calculation is made at all the arithmetic units.

In the present invention, the signals from the first and second selectors of the one-bit multiplier/divider are selected on the basis of the control signals corresponding to multiplication and division, and are output to the full adder. In the multiplier/divider for effecting multiplication or division in accordance with the control signal, the operational speed can be improved at the time of division in the same way as the divider above.

Also in the present invention, the signals from the first and second selectors of the one-bit multiplier/divider are selected on the basis of the control signals corresponding to multiplication and division, and are output to the full adder. Accordingly, the full adder which becomes necessary at the time of multiplication and division can be constituted into a common full adder, and the one-bit multiplier/divider can be allowed to function as a multiplier or a divider by selecting the inputs to the full adder by the control signal. Accordingly, multiplication and division can be executed by one operation using one circuit by switching the multiplier/divider to a multiplier or a divider by using the control signal. Since the full adder of the multiplier and the divider is used in common as described above, the circuit area can be made smaller than in the conventional arithmetic unit using a separate multiplier and divider.

DESCRIPTION OF THE PREFERRED EMBODIMENTS

Hereinafter, preferred embodiments of the present invention, wherein the divider according to the present invention is applied to a multiplier/divider, will be explained with reference to the accompanying drawings.

Figure 1:
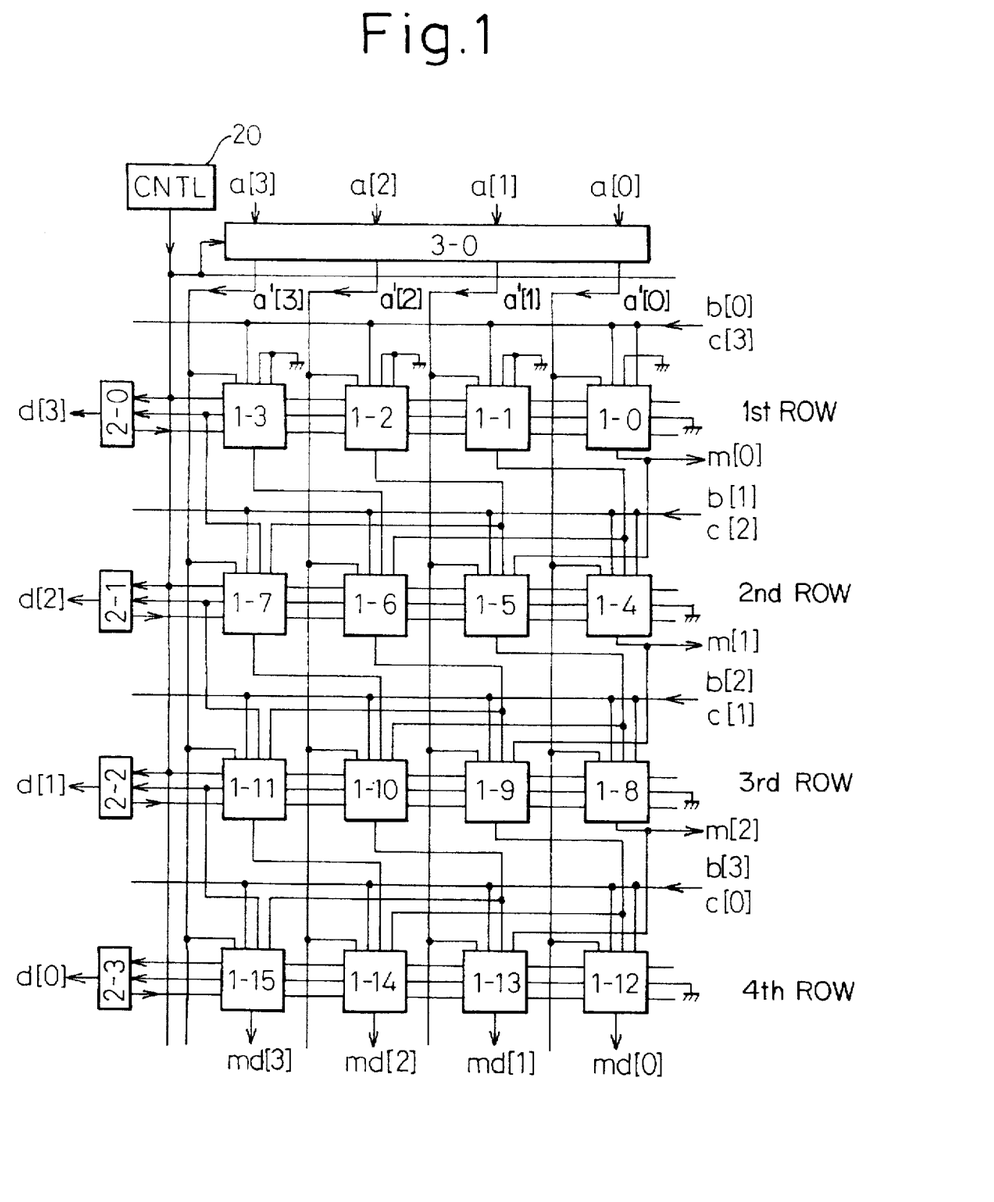
FIG. 1 is a block diagram showing a multiplier/divider according to the first embodiment of the present invention.

Referring to FIG. 1, the drawing illustrates a 4-bit multiplier/divider as a structural example of the present invention.

The construction shown in FIG. 1 primarily comprises sixteen one-bit multiplier/dividers 1-0, 1-1, 1-2, . . . , 1-14, 1-15 disposed in four rows and four columns, four control circuits 2-0, . . . , 2-3, and a complement calculator 3-0.

The complement calculator 3-0 is changed by using a control signal CNTL output from a control signal input unit 20, outputs the input data when the control signal CNTL is "1" (multiplication), and takes "the 2's complement" of the input data and outputs it when the CNTL signal is "0" (division). The term "2's complement" used herein means the value obtained by inverting the input signal and adding "1" to the least significant bit.

A divisor or multiplier a[n] (n=3, 2, 1, 0) is input from a higher order bit to the input terminal of the complement calculator 3-0, a dividend C[n] (n=3, 2, 1, 0) or a multiplicand b[n] (n=0, 1, 2, 3) is input to the extreme right fourth input (b0) of each of the four one-bit multiplier/dividers 1-0, 1-4, 1-8, 1-12 of the extreme right column, and the dividend C[n] (n=3, 2, 1, 0) or the multiplicand b[n] (n=0, 1, 2, 3) is also input to the second terminal (a1) of each one-bit multiplier/divider of each row.

The four control circuits 2-0, 2-1, 2-2, 2-3 of the extreme left column produce the outputs d[n] (n=3, 2, 1, 0) corresponding to the quotient of division, and the one-bit multiplier/dividers 1-15, 1-14, 1-13, 1-12 of the lowermost row produce the outputs md[n] (n=3, 2, 1, 0) corresponding to the remainder of the division. The output of multiplication is output to the output d[0] of the control circuit 2-3 and to the outputs md[n] (n=3, 2, 1, 0) and m[n] (n=2, 1, 0) of the one-bit multiplier/dividers 1-15, 1-14, 1-13, 1-12, 1-8, 1-4.

Figure 2:
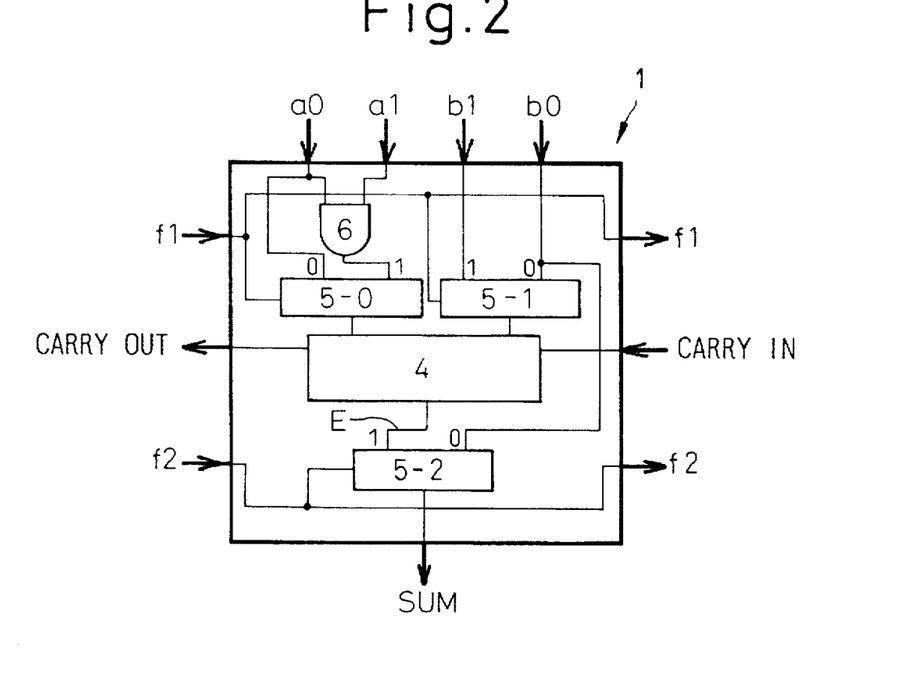
FIG. 2 is a circuit diagram showing a one-bit multiplication/division circuit shown in FIG. 1.

Next, a detailed structural example of each one-bit multiplier/divider 1 is shown in FIG. 2. The one-bit multiplier/divider 1 comprises a full adder 4, three selector circuits 5-0, 5-1, 5-2 and a logic (AND) circuit 6. The logic circuit 6 executes a logical product (AND) operation of data of the first and second terminal a0, a1. The first selector circuit 5-0 selects either the output from the AND circuit 6 or the data of the first terminal a0 on the basis of the signal of a terminal f1. In other words, it selects the data of the first terminal a0 when the terminal f1 (the control CNTL signal) is "0" (division) and selects the output from the AND circuit 6 when the latter is "1" (multiplication). Similarly, the second selector circuit 5-1 selects the data b0 of the fourth terminal when the terminal f1 (the control CNTL signal) is "0" (division) and selects the data of the third terminal b1 when the latter is "1" (multiplication).

The full adder 4 adds the output data from the first and second selector circuits 5-0, 5-1 and the carry input data (Carry in: Ci), outputs a carry output signal (Carry out: Co) to a next stage if any carry occurs as a result of addition, and outputs the addition result data E to the third selector circuit 5-2. This third selector circuit 5-2 selects the addition result data E of the full adder 4 and the data of the fourth terminal b0. In other words, it selects the addition result data E when the terminal f2 signal is "1" and selects the data of the fourth terminal b0 when the latter is "0".

The first and second selector circuits 5-0, 5-1 switch the signal lines for division and multiplication in accordance with the control signal CNTL, and the third selector circuit 5-2 switches the signal lines for division and multiplication in accordance with the terminal f2 signal and at the same time, switches at the time of division and multiplication as to whether subtraction of each digit is possible or not.

Figure 3:
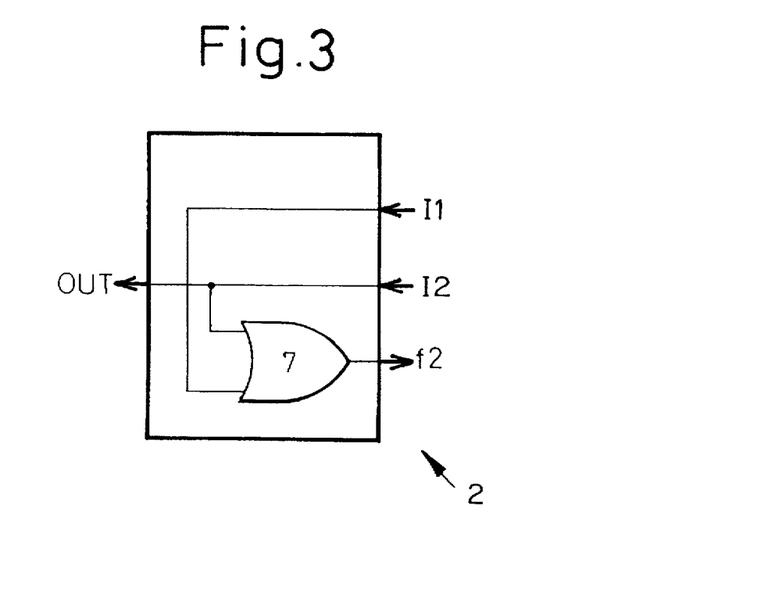
FIG. 3 is a diagram showing a control circuit shown in FIG. 1.

FIG. 3 shows a detailed structural example of the control circuit 2. The control circuit 2 comprises a logical OR circuit 7.

As already shown in FIGS. 1 and 2, the control CNTL signal is input to the input terminal I1 of the control circuit 2, and the carry output data Co from the one-bit multiplier/divider 1 of the extreme left column of each row is inputted to the input terminal I2. The output terminal f2 of this control circuit 2 is connected to the input terminal f2 of the one-bit multiplier/divider 2 of each row shown in FIG. 2.

The first terminal a0 of each of the one-bit multiplier/dividers 1-3, 1-2, 1-1, 1-0 of the first row is connected to the output from the complement calculator 3-0 as shown in FIG. 1, and each second terminal a1 is connected to the high order bit c[3] of the dividend or to the lower order bit b[0] of the multiplicand. Each third terminal b1 is connected to "0" and each fourth terminal b0 other than the one-bit multiplier/divider 1-0 of the fourth column is connected to "0". The high order bit c[3] of the dividend is connected to the fourth terminal b0 of the fourth column. The terminals f1, f2 of the one-bit multiplier/dividers 1-3, 1-2, 1-1, 1-0 and the terminals Co, Ci are connected to one another, respectively.

The input terminals I1 and I2 of the control circuit 2-0 of the first row are connected to the control signal CNTL and the output terminal Co of the one-bit multiplier/divider of the uppermost column, respectively, and its output terminal f2 is connected to all the input terminals f2 of the one-bit multiplier/dividers of the first row.

The first terminal a0 of each one-bit multiplier/divider 1-7, 1-6, 1-5, 1-4 of the second row is similarly connected to the output from the complement calculator 3-0, and the second terminal a1 is connected to the dividend C[2] or to the multiplicand b[1]. The third terminal b1 is connected to the SUM output of the one-bit multiplier/divider 1 of the higher order bit (higher column) of the first row, and only the third terminal b1 of the extreme left column is connected to the carry output Co of the one-bit multiplier/divider 1-3 of the highest bit of the first row. The fourth terminal b0 is connected to the SUM output of the one-bit multiplier/divider 1 of the lower order bit of the first row, which is lower by one, and only the fourth terminal of the extreme right column is connected to the dividend c[2] or to the multiplicand b[2]. The control circuit 2-1 of the second row is connected in the same way as the control circuit of the first row.

The one-bit multiplier/dividers 1 and the control circuits 2 of the third and fourth rows are connected in the same way as those of the first and second rows.

In this way, sixteen one-bit multiplier/dividers 1, the control circuits 2 and the complement calculator 3-0 are connected as shown in FIG. 1.

Next, the operation will be explained on the basis of the construction described above.

First of all, the control signal CNTL is "0" in the case of division. Therefore, the complement calculator 3-0 outputs the 2's complement a1[n] (n=3, 2, 1, 0) the first and second selectors 5-0, 5-1 of each one-bit multiplier/divider 1 select the data of the first terminal a0 and the data of the fourth terminal b0, and each one-bit multiplier/divider 1 operates as a divider. This operation will be explained with reference to FIGS. 9 and 10.

Figure 9:
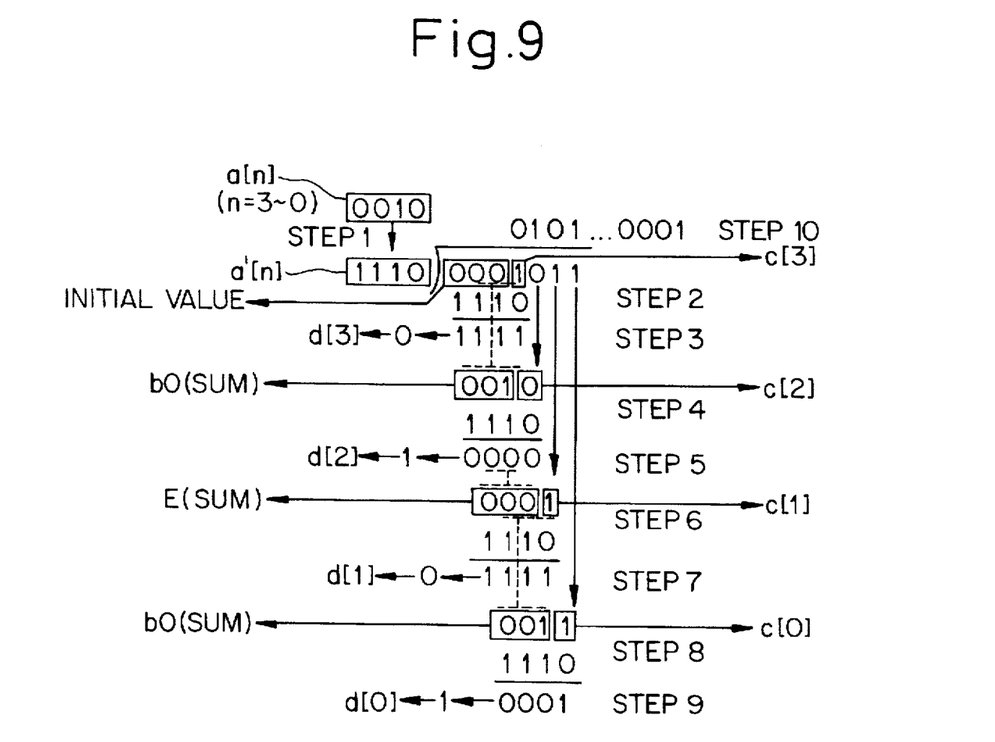
FIG. 9 is a diagram showing a division algorithm.
Figure 10:
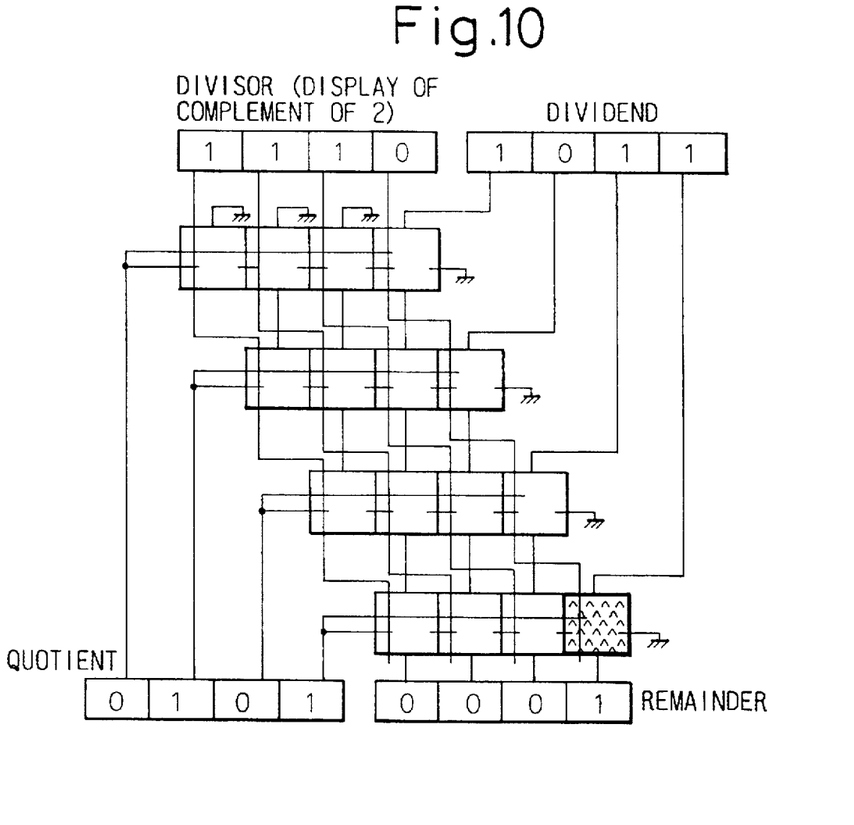
FIG. 10 is a diagram also showing a division algorithm.

The explanation will be hereby given on B(16)÷2(16) as an example of division of 4 bits÷4 bits. The number in the parenthesis ( ) represents a hexadecimal number.

FIG. 9 shows the calculation algorithm and FIG. 10 shows the relation between the divisor, the dividend, the remainder and the overall circuit. By the way, since the control signal CNTL is "0", the connection lines associated with multiplication are omitted in FIG. 10.

First, the 2's complement, i.e., H, of the divisor 2(16) is determined at STEP 1 of FIG. 9 (the 2's complement is output by the complement calculation circuit 3-0 in FIG. 1; this corresponds to the divisor (display by the 2's complement) in FIG. 10).

Examples 0010–1110 (2's complement)—①

STEP 2:

The complement (1110) and the most significant (fourth) bit (1) of the dividend B(1011) are added.

(This corresponds to the case where the output of the complement calculator 3-0 and the dividend c[3] are added by the full adder 4 in the one-bit multiplier/dividers 1-3, 1-2, 1-1, 1-0 of the first row in FIG. 1.)

Example:

1110 (2's complement)+0001 (fourth bit)—②

STEP 3:

Carry of STEP 2 is used as the quotient.

(This corresponds to the case where the carry output signal Co of the one-bit multiplier/divider 1-3 of the uppermost column of the first row in FIG. 1, that is, the output d[3] of the control circuit 2-0, is used as the high order bit.)

Example: 1110+0001=0_1111

The high order bit having this underline _ corresponds to the carry output.

The quotient becomes 1 or 0, and the data is passed over to the next STEP in the following way.

Here, when the quotient=1, the lower order 3 bits of the addition result of STEP 3 are passed over to the next. (The output f2 of the control circuit 2-0 shown in FIG. 1 becomes "1" when the quotient (input I2) is "1". Therefore, the third selectors 5-2 of the one-bit multiplier/dividers 1-2, 1-1, 1-0 select the addition result of the full adder 4, and the addition result is output to the fourth terminals b0 of the one-bit multiplier/dividers 1-7, 1-6, 1-5 of the second row.)

However, when quotient is zero, the three bits of the underlined portion of STEP 2 are passed over to the next STEP. (The output f2 of the control circuit 2-0 shown in FIG. 1 becomes "0" when the quotient is "0". Accordingly, the third selector 5-2 of each one-bit multiplier/divider 1-2, 1-1, 1-0 selects the signal of the fourth terminal b0, and outputs the value to the fourth terminal b0 of each one-bit multiplier/divider 1-7, 1-6, 1-5 of the second row.)

Example:

Quotient=0; hence, the lower order three bit data (001) of STEP 2 are passed over to STEP 4.

STEP 4:

Addition is made between the complement H, three bit data (001) from STEP 3 and data generated from the third bit (0) of the dividend (1011).

(This corresponds to the addition of the signal from the complement calculator 3-0 input to the first terminal a0 and the data input to the fourth terminal b0 [data comprising the data from the one-bit multiplier/dividers 1-2, 1-1, 1-0 of the one lower bit of the first row and the value c[2] of the third bit of the dividend] in the one-bit multiplier/dividers 1-7, 1-6, 1-5 of the second row in FIG. 1.)

Example: 1110+0010

STEP 5:

The carry of STEP 4 is used as the quotient in the same way as in STEP 3, and the addition result of the previous STEP or the three bits of the underlined portion of STEP 2 are passed over to the next STEP in accordance with the value of the quotient (1 or 0).

(This corresponds to the operation of the control circuit 2-1 of the second row in FIG. 1, and the detailed explanation will be omitted because it is the same as that of the first row.)

Example: 1110+0010=1 0000

The quotient is 1; therefore, 000 is passed over to STEP 6.

STEP 6:

The following addition is effected in the same way as in STEP 4:

1110+0001

(This corresponds to the calculation of the one-bit multiplier/divider of the third row in FIG. 1.)

STEP 7:

The following addition is effected in the same way as in STEP 3;

1110+0001=1111

The quotient is 0; therefore, 001 is passed over to STEP 8.

(This corresponds to the operation of the control circuit 2-2 of the third row of FIG. 1.) STEP 8:

The following addition is effected in the same way as in STEP 4 (1011):

1110+0011

(This corresponds to the calculation of the one-bit multiplier/divider of the fourth row of FIG. 1.)

STEP 9:

The following addition is effected in the same way as in STEP 3:

1110+0011=1 0001

The quotient is 1; therefore, 001 is passed over to STEP 10.

(This corresponds to the operation of the control circuit 2-3 of the fourth row of FIG. 1.)

STEP 10:

When put together, the quotient becomes 0101 and the remainder becomes 0001 from STEP 9; hence,

B(16)+2(16)=5(16) . . . 1(16)

Next, multiplication will be explained. Since the control signal CNTL becomes "1" in the case of multiplication, the output of the complement calculator 3-0 is output as such, the first and second selectors 5-0, 5-1 of each one-bit multiplier/divider 1 select AND between the input terminals a0 and a1 and the data of the input terminal b1, and each one-bit multiplier/divider operates as the multiplier. Accordingly, the one-bit multiplier/dividers 1-3, 1-2, 1-1, 1-0 of the first row calculate partial products between the multipliers a[3-0] and the least significant bit b[0] of the multiplicand, and output the result of calculation to the one-bit multiplier/dividers 1-6, 1-5, 1-4 of the second row which are in the lower order by one-bit, and to the output m[0]. Similarly, the one-bit multiplier/dividers of the second row calculate the partial products between the multipliers a[3-0] and the second digit bit b[1] of the second row, add the calculation result to the calculation result of the first row, and output the result to the one-bit multiplier/dividers 1-10, 1-9, 1-8 of the third row, which are in the lower order by one-bit, and to the output m[1].

When the operations described above are repeated, the multiplication result can be output to the output d[0] of the control circuit 2-3 and to the outputs md[n] (n=3, 2, 1, 0) and m[n] (n=2, 1, 0) of the one-bit multiplier/dividers 1-15, 14, 13, 12, 8, 4, 0.

The one-bit multiplier/dividers 1-3, 1-7, 1-71, 1-15 of the extreme left column have the same construction as the construction of the other one-bit multiplier/dividers, and incorporate therein the third selector 5-2. However, since this selector does not operate functionally, the third selector 5-2 may be deleted from only the one-bit multiplier/dividers of the extreme left column. In this way, the circuit area can be made smaller.

Next, the second embodiment of the present invention will be explained with reference to FIG. 4. In this embodiment, the one-bit multiplier/dividers and the control circuits at the center have the same construction as those of the first embodiment, and the control signal CNTL is connected to all of the one-bit multiplier/dividers and to the control circuits 2-0, 2-1, 2-2, 2-3 though it is not shown in the drawing. This second embodiment makes it possible to execute positive-negative mixture multiplication and division.

In this embodiment, the multiplier or the divisor is expressed by a[4], a[3-0], the multiplicand, by b[4], b[3-0], and the dividend, by c[4], c[3-0]. By the way, a[4], b[4] and c[4] are sign bits, and express a "positive number" when "0" and a "negative number", when "1".

Figure 4:
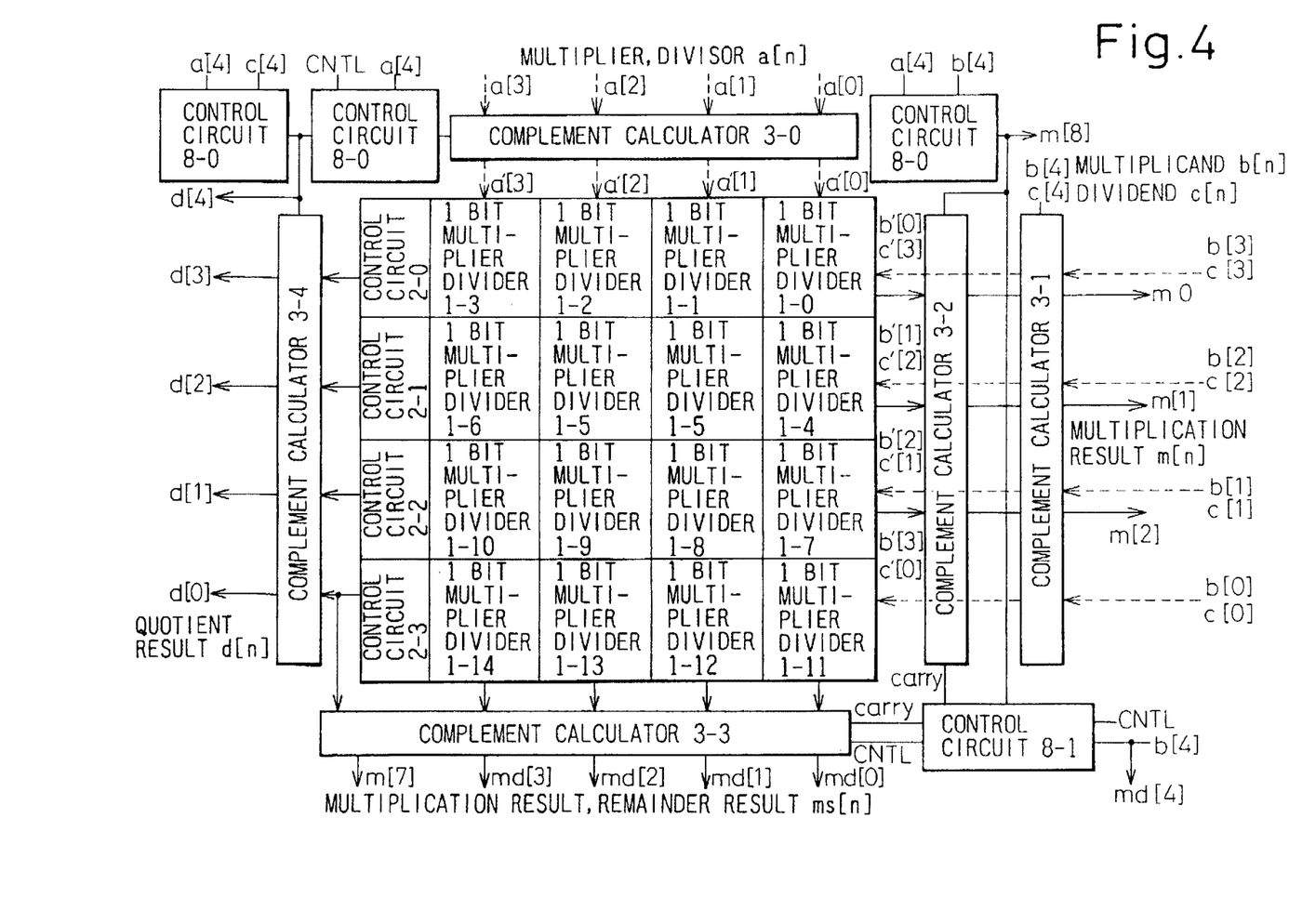
FIG. 4 is a block diagram showing a multiplier/divider according to the second embodiment of the present invention.

In FIG. 4, there are disposed the first complement calculator 3-1, the second complement calculator 3-2, the third complement calculator 3-2 and the fourth complement calculator 3-4.

The multiplier or the divisor a[3-0] is input to the complement calculator 3-0 in the same way as in FIG. 1, and the control circuit 8-0 is connected to the CNTL terminal.

Figure 5:
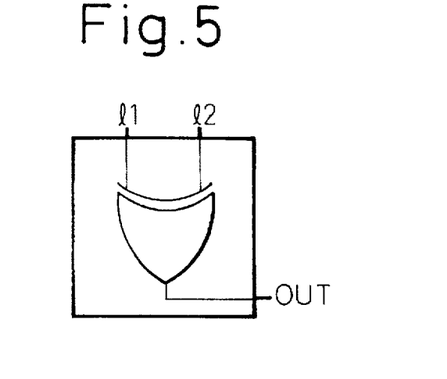
FIG. 5 is a diagram showing a control circuit 8-0 shown in FIG. 4.

This control circuit 8-0 comprises an exclusive-OR circuit as shown in FIG. 5, and the control circuit CNTL and the sign bit a[4] are input to the input of this control circuit 8-0. In the case of multiplication CNTL="1", therefore, the control circuit 8-0 outputs "1" when the sign bit a[4] of the multiplier is positive (0), and outputs "0" when the latter is negative 1. In the case of division (CNTL="0"), the control circuit 8-0 outputs "0" when the sign bit a[4] of the divisor is positive (0), and outputs "1" when the latter is negative (1). The complement calculator 3-0 outputs the 2's complement for the input data when the multiplier is negative and the divisor is positive, and outputs the result as such when the multiplier is positive and the divisor is negative, in accordance with the output of the control circuit 8-0.

The first complement calculator 3-1 inputs the multiplicand b[3-0] or the dividend c[3-0], and when the inversion signals of the sign bits b[4] and c[4] are input to the CNTL terminal, it switches whether the input is input as such, or the 2's complement is output. Accordingly, when the sign bits b[4], c[4] represent the negative value ("1"), it takes the 2's complement, converts the input to a positive number and outputs it. When the sign bits represent the positive value ("0"), it outputs as such this value. However, in the case of multiplication, the first complement calculator 3-1 inverts the lower bits of the complement b'[3-0] of the divided b[3-0] (or the dividend itself) to the high order bits, and connects b'[0] b'[1] b'[2] b'[3] to the one-bit multiplier/divider 1. In the case of division, it inputs the complement c'[3-0] of the dividend c[3-0] to the one-bit multiplier/divider 1.

The signal of the output SUM of the one-bit multiplier/divider of the fourth column is input to the second complement calculator 3-2, and this calculator outputs the lower order three bits m[2, 1, 0] of the multiplication result. The output of the control circuit 8-0 is connected to the CNTL terminal. This control circuit 8-0, too, has the construction shown in FIG. 5, and outputs the exclusive-OR of the sign bit a[4] of the multiplier and the sign bit b[4] of the dividend to the CNTL terminal of the second complement calculator 3-2. Accordingly, the second complement calculator 3-2 outputs the 2's complement when the product is negative, and outputs as such the product when the product is positive. The second complement calculator 3-2 outputs a carry signal to the control circuit B-1.

Figure 6:
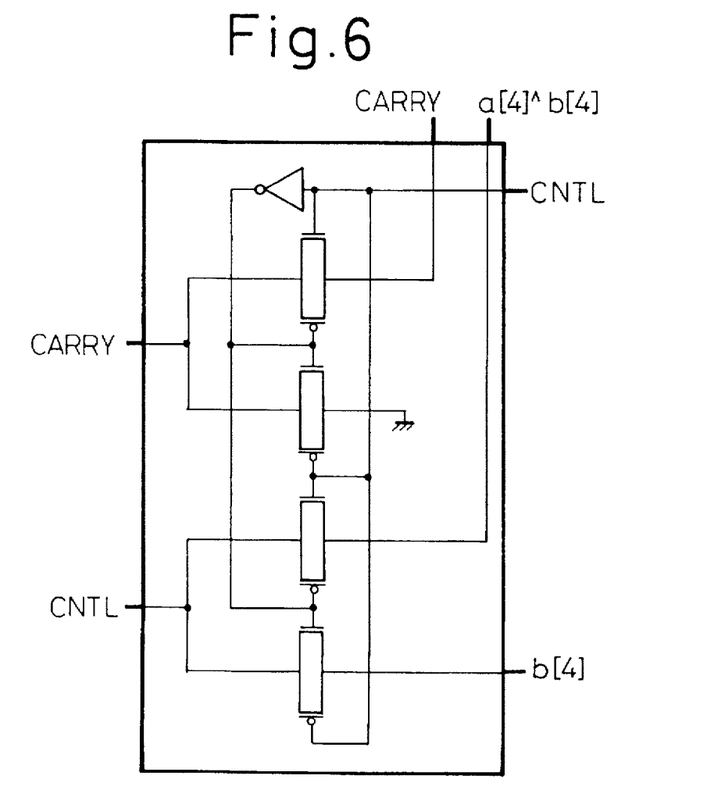
FIG. 6 is a diagram showing a control circuit 8-1 shown in FIG. 4.

The third complement calculator 3-3 inputs the output SUM of the one-bit multiplier/dividers of the fourth row and the output of the extreme left column and outputs these values either as such or m[7] md[3, 2, 1, 0] as the 2's complement depending on the signal of the CNTL terminal. This CNTL terminal is controlled by the control circuit 8-1, and the control circuit 8-1 switches the output of the control circuit 8-0 (the exclusive-OR of the sign bits a[4] and b[4]) or the sign bit a[4] on the basis of the control signal ("1" at the time of multiplication or "0" at the time of division) as shown in FIG. 6. At the time of multiplication ("1"), for example, the third control circuit 8-1 outputs the exclusive-OR of the sign bits a[4] and b[4] and at the time of division ("0"), it outputs the sign bit a[4]. The third complement calculator 3-3 inputs the carry signal from the control circuit 8-1. The control circuit 8-1 outputs the carry signal from the second complement calculator 3-2 or "0" on the basis of the control signal CNTL (which is "1" at the time of multiplication and "0" at the time of division). Accordingly, the control circuit 8-1 outputs the carry signal of the second complement calculator 3-2 during multiplication and outputs "0" during division.

Next, the operation will be explained in the construction described above.

First of all, the operation at the time of multiplication will be explained. At this time, the control signal CNTL is "1".

The complement calculator 3-0 outputs the signal either as such or the 2's complement to the one-bit multiplier/dividers on the basis of the positive or negative sign (the sign bit a4 is "0" or "1") of the multiplier a[4-0] in the same way as in the first embodiment. The first complement calculator 3-1 outputs the signal by inverting its upper and lower order bits or inverts the upper and lower order bits of the 2's complement and outputs it, to the one-bit multiplier/dividers of the extreme right column on the basis of the positive or negative sign (the sign bit b[4] is "0" or "1") of the dividend b[4-0]. As already described, multiplication is executed by each of the one-bit multiplier/dividers and the control circuits 2, and the value of the multiplication result is output from the high order bits to m[7] md[3-0] m[2-0] of the third and second complement calculators 3-3, 3-2. Here, these third and second complement calculators 3-3, 3-2 output the result as such or the 2's complement of the multiplication result on the basis of the positive or negative sign of the multiplication result. The sign of the multiplication result is output as the multiplication result sign bit m[8] by the upper right control circuit 8-0 on the basis of the sign bit a[4] of the multiplier and the dividend b[4].

Next, the operation at the time of division will be explained. At this time, the control signal CNTL is "0".

The complement calculator 3-0 outputs the 2's complement or the number itself to the one-bit multiplier/dividers on the basis of the positive on negative sign (the sign bit a[4] is "0" or "1") of the divisor a[4-0]. The first complement calculator 3-1 outputs the signal as such or the 2's complement to the one-bit multiplier/dividers 1 of the extreme right column on the basis of the positive or negative sign (the sign bit b[4] is "0" or "1") of the dividend c[4-0]. As already described, division is executed by each of the one-bit multiplier/dividers and the control circuits 2, and the result of division is output to d[3-0] of the fourth complement calculator 3-4, while the remainder result is output to md[3 - 0] of the third complement calculator 3-3. Here, the fourth complement calculator 3-4 outputs the division result as such or the complement of 2 of the division result on the basis of the positive or negative sign of the sign d[4] of the division result. Further, the third complement calculator 3-3 outputs the remainder result as such or the 2's complement of the remainder result on the basis of the positive or negative sign md[4] of the remainder result. The sign of the division result is output as the division result sign bit d[4] by the upper left control circuit 8-0 on the basis of the sign bit a[4] of the divisor and the sign bit c[4] of the dividend. The sign of the remainder result is outputted as the remainder result sign bit md[4] by the lower right control circuit 8-1 on the basis of the sign bit b[4] of the dividend.

As described above, the second embodiment can execute positive and negative mixture multiplication and division by the operations of the complement calculation circuits 3-1, 3-2, 3-3, 3-4 and the control circuits 8-0, 8-1.

Next, the third embodiment of the present invention will be explained with reference to FIGS. 7 and 8.

This embodiment is directed to increase the speed of the division operation by omitting the operation of the one-bit multiplier/dividers which are not necessary during division.

This embodiment uses control circuits 9-0, 9-1, 9-2, 9-3 in place of the control circuits 2 in the first embodiment.

The control circuit 9-3 is the same as the control circuit 2-3 of the first embodiment. Accordingly, its explanation is omitted.

Figure 7:
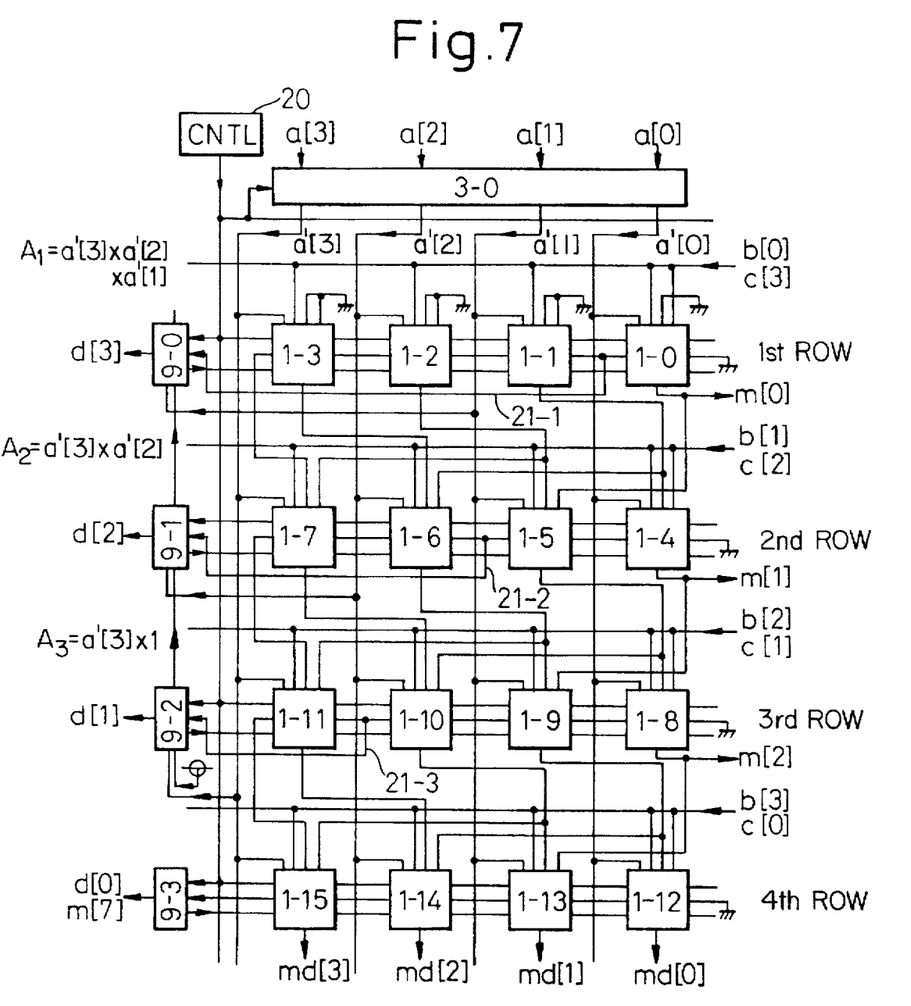
FIG. 7 is a block diagram showing a multiplier/divider according to the third embodiment of the present invention.
Figure 8:
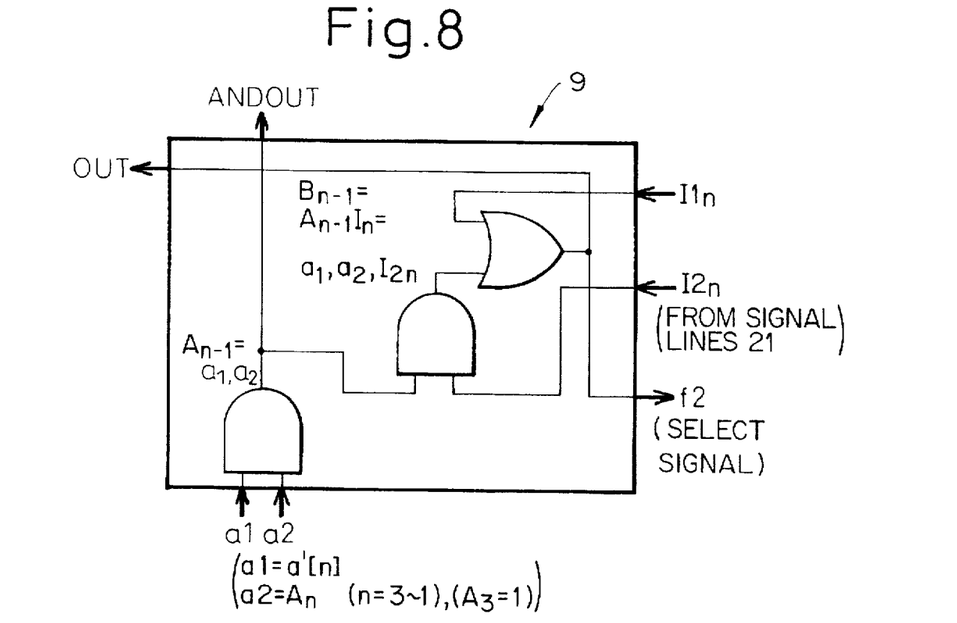
FIG. 8 is a diagram showing control circuits 9-0, 9-1, 9-2 in FIG. 7.

This control circuit 9 comprises two AND circuits and an OR circuit as shown in FIG. 8. The control circuit 9-2 of the third row calculates AND between the output a'[3] of the complement calculator 3-0 applied to the input terminal a1 and the carry output of the one-bit multiplier/divider 1-10 applied from the signal line 21-3 to the input terminal $I2_3$, then calculates OR with the control signal CNTL applied to the input terminal $I1_3$ and outputs the output f2 to all the one-bit multiplier/dividers 1 of the third row. The AND result of the control circuit 9-2 is connected to the input terminal a2 of the control circuit 9-1 of the upper row to output $A_2$=a'[3]×I. The input terminal a2 of the control circuit 9-2 is set to "1".

The control circuit 9-1 of the second row calculates the first AND between the output a'[2] of the complement calculator 3-0 applied to the input terminal a1 and the AND result of the control circuit 9-2 of the lower row applied to the input terminal a2, then calculates the second AND between the first AND result $A_1$=a'[5]×a'[2] and the carry output of the one-bit multiplier/divider 1-5 applied from the signal line 21-2 to the input terminal $I2_2$, calculates OR between the second AND and the control signal CNTL applied to the input terminal $I1_2$, and outputs the output f2 to all the one-bit multiplier/dividers 1 of the second row.

The control circuit 9-0 calculates the first AND between the output a'[1] of the complement calculator 3-0 and the AND result of the control circuit 9-1 of the lower row, then calculates the second AND between this first AND result $A_0$=a'[3]×a'[2]×a'[1] and the carry output of the one-bit multiplier/divider 1-0 input from the signal line 21-1, calculates the OR between the second AND and the control signal CNTL, and outputs the output f2 to all the one-bit multiplier/dividers 1 of the first row.

The operation will be explained on the basis of the construction described above.

Here, the explanation will be given about B(16)÷2(16) as an example of division of four bits by four bits. The number inside the parenthesis ( ) represents a hexadecimal number. The complement calculator 3-0 outputs a 2's complement "1110" of a divisor 2(16). Therefore, a'[1], a'[2], and a'[3] input by the control circuit 9-0, 9-1, and 9-2 are all "1".

First of all, since the first AND of the control circuit 9-0 of the first row is "1" ($A_0$=a1×a2=a'[3]×a'[2]×a'[1]=1×1×1=1) and the Input I2 (the carry output data of the one-bit multiplier/divider 1-0) is "0", the second AND of the control circuit 9-0 of the first row becomes "0" ($B_2$=$A_1$×$I2_2$=1×0=0) and the output f2=0 is output to the one-bit multiplier/divider of the first row. This output f2 is input to the third selector circuit 5-2 of the one-bit multiplier/divider 1, and the one-bit multiplier/divider 1-0 outputs b[0] of the dividend as such to the one-bit multiplier/divider 1-5. When the input $I2_1$ of the control circuit 9-0 (the carry output data of the one-bit multiplier/divider 1-0) is "1", the operation value of the second AND is 1, i.e. ($B_1$=$A_1$×$I2_1$=1×1=1), and OR becomes 1. Therefore, the output f2 becomes "1", and the one-bit multiplier/divider 1-0 outputs the addition result to the one-bit multiplier/divider 1-5 of the second row which is higher by one bit.

As can be understood from the operation of this first row, after the one-bit multiplier/divider 1-0 of the least significant bit executes the operation without the operation of the three one-bit multiplier/dividers 1-3, 1-2, 1-1, the operation of the one-bit multiplier/divider of the next second row is executed. Accordingly, since the operation time of the three one-bit multiplier/dividers becomes unnecessary, the operation time in the first row can be reduced as much.

Similarly, in the control circuit 9-1 of the second row, too, the first AND becomes "1", the input $I2_2$ (the carry output data of the one-bit multiplier/divider 1-5) becomes "1" and the second AND becomes "1". Therefore, the output f2 is output as f2=1 to the one-bit multiplier/divider of the second row. Due to this output f2, the one-bit multiplier/dividers 1-5 and 1-4 output the addition results to the one-bit multiplier/dividers 1-10, 1-9 of the third row which are higher bit by one. As can be understood from the operation of this second row, after the operations of the one-bit multiplier/dividers 1-5, 1-4 of the lower order bit is executed without the operation of the two one-bit multiplier/dividers 1-7, 1-6, the operation of the one-bit multiplier/dividers of the next third row is executed. Accordingly, since the operation time of the two one-bit multiplier/dividers 1-7, 1-6 becomes unnecessary, the operation time in the second row can be reduced as much.

Similarly, in the control circuit 9-2 of the third row, too, its first AND becomes "1", the input $I2_3$ (the carry out data of the one-bit multiplier/divider 1-10) becomes "0" and the second AND is "0". Therefore, the output f2 is output as f2=0 to the one-bit multiplier/dividers of the third row. Due to this output f2, the one-bit multiplier/dividers 1-10, 1-9, 1-8 output the data of the fourth input terminals b0 to the one-bit multiplier/dividers 1-15, 1-14, 1-13 of the next fourth row, which are higher by one bit. As can be understood from the operation of this third row, only the operation of the one-bit multiplier/dividers 1-10, 1-9, 1-8 of the lower order bits is executed without executing the operation of the one-bit multiplier/divider 1-11 of the higher bit, and then the operation of the one-bit multiplier/dividers of the next fourth row is executed. Accordingly, since the operation time of the one-bit multiplier/divider 1-1 becomes unnecessary, the operation time can be reduced.

Since the control signal CNTL becomes "1" during multiplication, the control circuits 9-0, 9-1, 9-2 output "1" to the output f2. Therefore, multiplication is executed in the same way as above.

As described above, since the operation time for the six one-bit multiplier/dividers 1-3, 1-2, 1-1, 1-7, 1-6, 1-11 for which the operation is not executed in division becomes unnecessary, the operation time for division can be reduced.

Next, the fourth embodiment of the present invention which is constituted as a divider will be explained.

The divider is mainly constituted by applying the conventional division cells shown in FIG. 12(a) to the one-bit multiplier/dividers 1-0 to 1-15 shown in FIG. 7. The difference of this construction from that of the third embodiment will be described, but the explanation of the same constituents will be omitted by using the same reference numerals.

Figure 11:
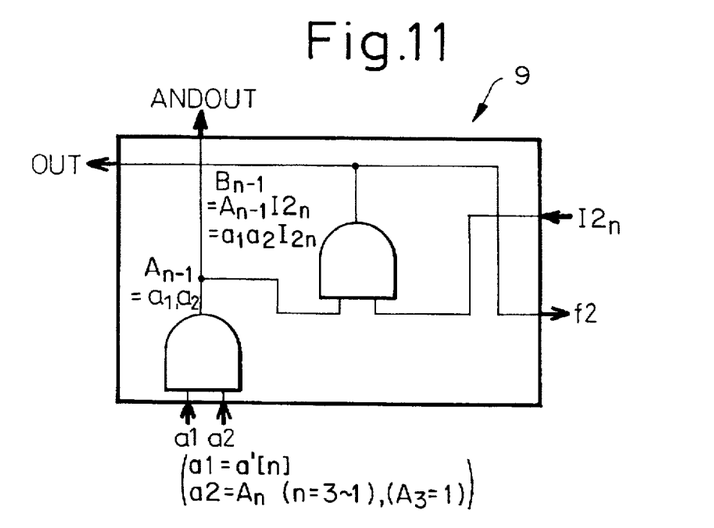
FIG. 11 is a diagram showing a control circuit (logical product circuit) in the fourth embodiment.

In the multiplier/divider shown in FIG. 7, the divider does not need the control signal input unit 20 and the signal input line for inputting the control signal CNTL from the control signal input unit 20. Since the control circuits 9-0 to 9-2 also do not need the control signal CNTL, they are constituted in the circuits obtained by deleting the OR function from the control circuits 9-0 to 9-2 of FIG. 8, that is, two ANDs shown in FIG. 11 (which correspond to the AND circuits of the present invention).

Figure 13:
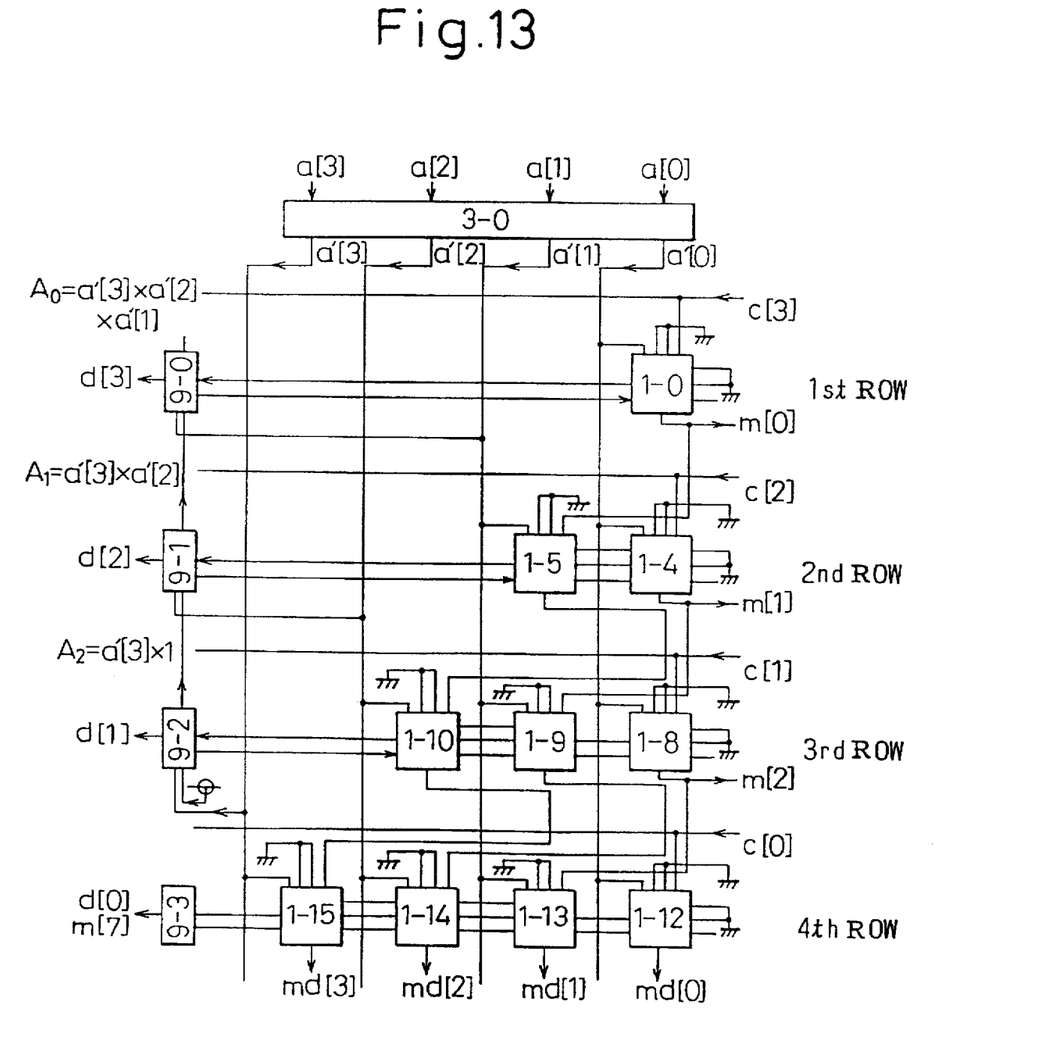
FIG. 13 shows a dedicated divider of 4 bits.

The operation of this divider is the same as the operation of the multiplier/divider explained in the third embodiment described above during its division operation, and not only the time necessary for division but also the number of one-bit multiplier-dividers can be reduced as shown in FIG. 13.

We claim:

1. A divider comprising:

a plurality of groups of arithmetic units, arithmetic units in each said group connected in series and corresponding to a number of bits of first data, a selected one of said arithmetic units in each of said groups being a most significant arithmetic unit, wherein each of said arithmetic units comprises:

an adder for inputting said first data, second data, and carry input data, effecting an addition operation of said first data, said second data and said carry input data, and outputting addition result data to a next arithmetic unit; and a selector for selecting either said addition result data from said adder or said second data in accordance with a select signal;

a divisor data input unit for inputting a 2's complement of divisor data as said first data;

signal lines, each connected to receive carry output data from each of said most significant arithmetic units, respectively, a first group of said arithmetic units each receiving a bit of dividend data as said second data and a second group of said arithmetic units each receiving an output of one of said arithmetic units from said first group or said second group as said second data; and a plurality of AND circuits, each corresponding to one bit in said divisor data, each of said AND circuits calculating a logical product of a corresponding bit of said divisor data and carry output data sent from a corresponding signal line, and supplying said logical product as said select signal to said selector of corresponding arithmetic units.

2. A divider according to claim 1 wherein said plurality of arithmetic units are connected in a plurality of rows and a plurality of columns, the number of rows and columns corresponding to the number of constituent bits of inputted data, and wherein one of said arithmetic units in each of said rows is a most significant arithmetic unit.

3. A multiplier/divider comprising:

a plurality of arithmetic units in a plurality of rows and columns connected to correspond to the number of constituent bits of input data, one of said arithmetic units in each of said rows being a most significant arithmetic unit, wherein each of said arithmetic units comprises:

control signal generation means for generating a multiplication or division control signal;

a logic circuit for effecting a logical product operation between first data and second data;

a first selector for selecting either an output of said logic circuit or said first data using said control signal;

a second selector for selecting third data or fourth data using said control signal;

an adder for receiving data sent by said first selector, data sent by said second selector and carry input data, adding said data and sending addition result data and carry output data to a next arithmetic unit; and a third selector for selecting either said addition result data or said fourth data using a select signal;

a divisor data input unit for inputting a 2's complement as divisor data at a time of division of said first data;

signal lines, each connected to receive said carry output data from each of said most significant arithmetic units, respectively, a first column of said arithmetic units each receiving one bit of dividend data as said fourth data, and in all columns other than said first column, others of said arithmetic units receiving output data from said third selectors of said arithmetic units of a previous row as said fourth data; and a plurality of logical product circuits, each for calculating a logical product of one bit of said divisor data and carry output data sent from a corresponding signal line, and supplying said logical product as said select signal to said third selector.

4. A multiplier/divider according to claim 3, wherein said divisor data input unit is switched by said control signal generation means, outputs an input signal at the time of multiplication, and outputs a 2's complement of said input data at the time of division.

5. A multiplier/divider comprising:

a plurality of one-bit multiplier/divider units connected in rows and columns corresponding to a number of constituent bits of data input, wherein each of said one-bit multiplier/divider units comprises:

control signal generation means for generating multiplication and division control signals;

a logic circuit for executing a logical product operation on first data and second data;

a first selector for selecting either an output of said logic circuit or said first data in accordance with said control signals;

a second selector for selecting third data or fourth data in accordance with said control signals;

an adder for receiving data from said first selector, data from said second selector, and carry input data, executing an addition operation of said data, and outputting addition result data and carry output data; and a third selector for selecting either said addition result data from said adder, or said fourth data for output to a next arithmetic unit; and logical sum circuits, one supplying a logical sum of one of said carry output data of said one-bit multiplier/divider units of each of said rows and said control signals as a select signal to said third selector of other of said multiplier/divider units in that row.

6. A multiplier/divider according to claim 5, further comprising a complement calculator at each input and output terminal of said one-bit multiplier/divider for displaying said input and output data of said one-bit multiplier/divider as a 2's complement, and for executing positive and negative mixed multiplication and division.

7. A divider comprising:

a plurality of groups of arithmetic units, arithmetic units in each said group connected in series and corresponding to a number of bits of first data, a selected one of said arithmetic units in each of said groups being a most significant arithmetic unit, wherein each of said arithmetic units comprises:

an adder for inputting said first data, second data, and carry input data, effecting an addition operation of said first data, said second data and said carry input data, and outputting addition result data to a next arithmetic unit; and a selector for selecting either said addition result data from said adder or said second data in accordance with a select signal;

a divisor data input unit for inputting a 2's complement of divisor data as said first data;

signal lines, each connected to receive carry output data from each of said most significant arithmetic units, respectively;

first AND circuits connected in series, the number of first AND circuits being one less than the number of bits of the divisor data, one of said first AND circuits receiving a most significant bit of said first data as a first input and bit value 1 as a second input, and the remainder of said first AND circuits receiving an output of another first AND circuit as the first input and bit data starting from the second most significant bit of said first data as the second input, each of said first AND circuits calculating a first logical product from the first input and the second input to predict where 0 bit data is contained in the divisor data; and second AND circuits that calculate second logical products from said carry output data obtained from each of said most significant arithmetic units sent from said signal lines and said first logical products of said second AND circuits becoming the select signal of said selector of an arithmetic unit of a corresponding group.

8. A divider according to claim 7 wherein said plurality of arithmetic units has a number of stages corresponding to the number of bits of said first data, each stage having a most significant arithmetic unit selected out of said plurality of arithmetic units.

9. A divider comprising:

a plurality of arithmetic units arranged in a number of stages corresponding to a number of bits of a dividend data, each stage having a most significant arithmetic unit out of said plurality of arithmetic units, wherein each of said arithmetic units comprises:

an adder for inputting first data, second data, and carry input data, effecting an addition operation of said first data, said second data, and said carry input data, and outputting addition data and carry output data, said first data being a 2's complement of a divisor data and being output to each adder of each stage starting from a least significant bit of said first data, said second data having 0 bit data of said dividend data as a least significant bit and other data other than the least significant bit from each adder of a preceding stage; and a selector for sending said second data to each adder of a next stage by a select signal;

signal lines, each connected to receive said carry output data from each of said most significant arithmetic units, respectively;

first AND circuits connected in series, the number of first AND circuits being one less than a number of bits of the divisor data, one of said first AND circuits receiving a most significant bit of said first data as a first input and bit value 1 as a second input, and the remainder of said first AND circuits receiving an output of another first AND circuit as the first input and bit data starting from the second most significant bit of said first data as a second input, each of said first AND circuits calculating a first logical product from the first input and the second input to predict where 0 bit data is contained in the divisor data; and second AND circuits that calculate second logical products from said carry output data obtained from each of said most significant arithmetic units sent from said signal lines and said first logical products of said first AND circuits so that output of said second AND circuits become the select signal of said selector of an arithmetic unit of a corresponding stage.

10. A multiplier/divider comprising:

a plurality of arithmetic units arranged in a plurality of rows and a plurality of columns, the number of rows and columns corresponding to the number of constituent bits of input data, one of said arithmetic units in each of said rows being a most significant arithmetic unit, wherein each of said arithmetic units comprises:

control signal generation means for generating a multiplication or division control signal;

a logic circuit for effecting a logical product operation between first data and second data;

a first selector for selecting either an output of said logic circuit or said first data using said control signal;

a second selector for selecting third data or fourth data using said control signal;

an adder for receiving data sent by said first selector, data sent by said second selector and carry input data, adding said data, and sending addition result data and carry output data to a next arithmetic unit; and a third selector for selecting either said addition result data or said fourth data using a select signal;

a divisor data input unit for inputting a 2's complement of divisor data at a time of division as said first data;

signal lines, each connected to receive said carry output data from each of said most significant arithmetic units, respectively, a first column of said arithmetic units each receiving one bit of dividend data as said fourth data, and in all columns other than said first column, others of said arithmetic units receiving output data from said third selectors of said arithmetic units of a previous row as said fourth data;

first AND circuits connected in series, the number of first AND circuits being one less than a number of bits of the divisor data, one of said first AND circuits receiving a most significant bit of first data as a first input and bit value 1 as a second input, and the remainder of said first AND circuits receiving an output of another first AND circuit as the first input and bit data starting from the second most significant bit of said first data as the second input, said first AND circuits calculating first logical products between the first input and the second input to predict where 0 bit data is contained in the divisor data; and second AND circuits that calculate second logical products from said carry output data obtained from each of said most significant arithmetic units sent from said signal lines and said first logical products output from said first AND circuits so that outputs of said second AND circuits become the select signal of said third selector of an arithmetic unit of a corresponding row.

* * * * *